United States Patent
Houbertz et al.

(10) Patent No.: US 10,836,105 B2
(45) Date of Patent: Nov. 17, 2020

(54) DEVICE AND METHOD FOR CREATING THREE-DIMENSIONAL STRUCTURES

(71) Applicant: Multiphoton Optics GmbH, Wuerzburg (DE)

(72) Inventors: Ruth Houbertz, Wuerzburg (DE); Thomas Stichel, Wuerzburg (DE); Soenke Steenhusen, Wuerzburg (DE)

(73) Assignee: Multiphoton Optics GmbH, Würzburg (DE)

(*) Notice: Subject to any disclaimer, the term of this patent is extended or adjusted under 35 U.S.C. 154(b) by 171 days.

(21) Appl. No.: 15/625,515

(22) Filed: Jun. 16, 2017

(65) Prior Publication Data
US 2017/0282453 A1    Oct. 5, 2017

Related U.S. Application Data

(62) Division of application No. 13/696,966, filed as application No. PCT/EP2011/057640 on May 11, 2011, now abandoned.

(30) Foreign Application Priority Data

May 11, 2010 (DE) .......... 10 2010 020 158

(51) Int. Cl.
*B29C 64/273* (2017.01)
*B33Y 30/00* (2015.01)
(Continued)

(52) U.S. Cl.
CPC .......... *B29C 64/273* (2017.08); *B29C 64/135* (2017.08); *B29C 64/386* (2017.08);
(Continued)

(58) Field of Classification Search
CPC ... B29C 64/273; B29C 64/386; B29C 64/135; B29C 67/0066; B29C 2035/0827;
(Continued)

(56) References Cited

U.S. PATENT DOCUMENTS

| 6,583,381 B1* | 6/2003 | Duignan | B23K 15/0006 219/121.69 |
| 2004/0126694 A1* | 7/2004 | Devoe | G02B 3/06 430/270.1 |
| 2009/0130334 A1* | 5/2009 | Choy | B82Y 30/00 427/553 |

FOREIGN PATENT DOCUMENTS

WO    WO-9006540 A1 *   6/1990   ............ B01J 19/121

OTHER PUBLICATIONS

Machine Translation of WO-9006540-A1 (Year: 1990).*

* cited by examiner

*Primary Examiner* — Leith S Shafi
(74) *Attorney, Agent, or Firm* — Duane Morris LLP

(57) ABSTRACT

The present invention relates to a device as well as a method for creating three-dimensional structures consisting of a material to be consolidated, in particular a material containing organopolysiloxane, by way of locally selective consolidation of the latter as a result of light-induced organic cross-linking. The device is characterized by a movable focusing optical system for the formation of one or a plurality of laser foci, wherein either the laser beam of a laser source can be introduced into the material to be consolidated through the material container and a movable carrier unit is arranged in said container or the focusing optical system is immersed into the material bath and the laser beams can be introduced into the material to be consolidated via a beam exit area of the focusing optical system. In the method, a focusing optical system that is movable in at least one plane is used for the formation of at least one laser focus, and a movable carrier unit is positioned in the material to be consolidated in one embodiment.

10 Claims, 8 Drawing Sheets

(51) Int. Cl.
*B33Y 10/00* (2015.01)
*B33Y 50/02* (2015.01)
*B29C 64/135* (2017.01)
*B29C 64/386* (2017.01)
*B33Y 70/00* (2020.01)

(52) U.S. Cl.
CPC ............... *B33Y 10/00* (2014.12); *B33Y 30/00* (2014.12); *B33Y 50/02* (2014.12); *B33Y 70/00* (2014.12)

(58) Field of Classification Search
CPC ............... B29C 35/0888; B29C 66/71; B29C 2035/0838; B29C 67/0077; B29C 43/003; B29C 2037/903; B29C 65/1616; B29C 16/38; B29C 2035/0822; B33Y 50/02; B33Y 10/00; B33Y 30/00; B33Y 70/00
USPC ............... 425/174.4, 174; 264/401, 482, 494
See application file for complete search history.

DEVICE AND METHOD FOR CREATING THREE-DIMENSIONAL STRUCTURES

CROSS REFERENCE TO RELATED APPLICATION

This application is a divisional of U.S. application Ser. No. 13/696,966, which was filed in the United States Patent and Trademark Office on Nov. 8, 2012.

BACKGROUND OF THE INVENTION

The present invention relates to a device as well as a method for creating three-dimensional structures, such as solids or surface structures consisting of a material to be consolidated, in particular a material containing organopolysiloxane, by way of locally selective consolidation of the latter as a result of light-induced organic cross-linking.

The prior art comprises descriptions about the creation of three-dimensional solids or surface structures e.g. by means of light-induced processes, in particular by means of organic cross-linking, in that initially only one layer or plane is produced as a two-dimensional component of the structure to be created and the three-dimensional design of the solid or the surface structure is achieved with the successive processing of consecutive two-dimensional layers or planes. Examples of said two-dimensionally designed methods include stereolithography, selective laser sintering (SLS) or 3D printing (3DP). The disadvantages of two-dimensional methods are the relatively long production times, because the solids to be manufactured are generated layer by layer and a new layer to be consolidated has to be prepared after the consolidation of every layer. These disadvantages are particularly serious if the solids to be manufactured are to be designed with sizes up to millimeter and centimeter range.

In a special stereolithography variant, the exposure is achieved through the transparent bottom of the bath tank in order to prevent an interaction of the developing solid with the gaseous atmosphere above the bath surface, e.g. an oxidation reaction. In the process, the liquid material is consolidated in the direct vicinity of the bottom of the tank. To prevent the consolidating material from adhering to the bottom, the latter has to be coated with a non-polymerizable fluid acting as a separation layer, see DE 41 02 260 A1, claim 13. This makes it difficult to control the method, because the fluid to be consolidated has to be able to flow into the gap between the separating layer and the last consolidated layer when the carrier platform is moved, without swirling the separating fluid. Consequently, the method is hardly suitable for the manufacture of solids made of highly-viscous starting materials, such as is often the case with organopolysiloxanes, especially solvent-free ones.

Faster processes provide three-dimensional methods in which the material-modifying radiation interacts directly with the volume of a still untreated, solid or liquid starting material. The use of two- or multiphoton polymerization for the consolidation of materials containing organopolysiloxane (polymerization is achieved with two- (TPA) or multiphoton absorption) has been disclosed in WO 03/037606 A1. In the process, radiation with a wavelength is used which is not absorbed in the reactive material under normal circumstances. Multiphoton absorption in the focus of the lens is achieved by focusing femtosecond laser pulses into the material, whereby similar chemical alterations can be induced as with the use of a laser beam having considerably shorter wavelengths. Thus it is possible to specifically trigger alterations of the material in the three-dimensional space.

One disadvantage of known three-dimensional methods as well as devices for their execution is that structures can only be created with a limited size in the micrometer range, especially in connection with high demands in terms of accuracy. This disadvantage is due to the small working distance of the lens required to achieve adequate accuracy, i.e., the distance between the focal plane and the exit pupil of the lens, which is generally variable and independent of the numerical aperture of the used lens. For instance, the working distance of high-resolution lenses with a numerical aperture of NA=0.9 to 1.4 is approximately 500 µm to 200 µm. With known methods and devices for the consolidation of materials by way of multiphoton polymerization, the material to be consolidated is for example arranged in the quantity of a drop between two optical slides as microscope slides or adhering to an uncovered microscope slide. A defined interface has to be exposed to enable an exposure under defined conditions. For material arranged between two slides, the exposure is achieved through one of the two slides from above or from below. With an uncovered microscope slide, the exposure is achieved from below through the underside of the microscope slide. As a disadvantage, no larger structures can be consolidated, because material on the side facing away from the lens can only be consolidated at a limited distance from the microscope slide which is defined by the work status of the lens because of the exposure through or via the microscope slide. With the currently known three-dimensional consolidation methods, the size of manufacturable structures is limited to about 100 µm to 700 µm, depending on the required accuracy.

In WO 92/00185, a special device variant relates to a vertically (i.e., along the optical axis) movable focusing optical system with a high numerical aperture, which—to prevent errors caused by fluid-air interfaces—is immersed into a bath with the same material to be consolidated as the one provided as bath material for the manufacture of the consolidated solid. The focus of the device is located outside of this bath in a second bath.

For a similar method, it is proposed in DE 101 11 422 A to arrange the bath tank on a table movable along the X-Y plane and to provide a construction platform in it which is movable in Z-direction to allow the variable positioning of the focus (focal area) in a suitable manner. In the process, the exposure is aimed into the open bath surface from above. Alternatively, the focus is moved in X- and Y-direction by means of a scanner system, i.e., with one or a plurality of movable mirror(s). With this system, no high numerical aperture of the lens can be used and hence no high structural resolution with simultaneously free selectable mold size can be achieved. Moreover, errors occur as a result of the exposure via the open bath surface which does not represent a clean optical surface.

SUMMARY OF THE INVENTION

Based on the prior art described above, the object of the present invention is to provide a device as well as a method for creating three-dimensional solids or surface structures by way of locally selective consolidation of a material as a result of light-induced organic cross-linking, whereby essentially any shapes of solids and structures, in particular with dimensions as well as heights in the millimeter and centimeter range, preferably with shorter production times compared to the prior art and corresponding high resolution, low material expenses and with high accuracy as well as reproducibility can be created. In particular, the invention is designed to also allow the creation of large solids with very high accuracy.

With respect to the device, the object is achieved with a device for creating three-dimensional structures consisting of a material to be consolidated, in particular a material containing organopolysiloxane, by way of locally selective consolidation of the latter as a result of light-induced cross-linking, comprising a laser source, a movable focusing optical system for creating one or a plurality of laser foci and a material container for the material to be consolidated, wherein the material container consists at least partially of a material that is permeable for the used laser beam and is, or can be, arranged in the beam path in such a way that the laser beam can be introduced into the material to be consolidated through the material container, wherein the material container acts as optically defined interface and wherein a carrier unit is arranged in the material container which can be positioned relative to the latter. The focusing optical system is preferably designed movable on at least one plane, while the carrier unit is movable perpendicular thereto. It is particularly preferable that the focusing unit is below the bath tank and is movable at least in the horizontal plane (X-Y), while the carrier unit is movable perpendicular thereto in Z-direction. In exceptional cases, the focusing unit can be arranged above the bath tank instead, if the latter has a lid and the bath material reaches all the way to the lid. In one variant of the invention, the focusing optical system is arranged on the side of the bath tank and can be moved at least in one X-Z or Y-Z plane, while the carrier unit is analogously movable in Y- or X-direction, respectively.

In addition, the object is achieved with a device for creating three-dimensional structures consisting of a material to be consolidated, in particular a material containing organopolysiloxane, by way of locally selective consolidation of the latter as a result of light-induced cross-linking, comprising a laser source, a movable focusing optical system for creating one or a plurality of laser foci and a material container for the material to be consolidated, wherein the focusing optical system is impermeable to the material to be consolidated and arranged immersible in the material container in such a way that the beam exit surface of the focusing optical system itself creates the optically defined interface. In the process, the focusing optical system is preferably movable in all three directions in space and can hence be positioned freely in the bath.

With respect to the method, the object is achieved with a method for creating three-dimensional structures consisting of a material to be consolidated, in particular a material containing organopolysiloxane, by way of locally selective consolidation of the latter as a result of light-induced organic cross-linking based on laser radiation, wherein the material to be consolidated is or will be arranged in a material container, the material container is permeable for the used laser at least in some areas, a laser pulse or a laser pulse sequence is positioned through the material container into the material to be consolidated onto at least one laser focus in such a way that the material container forms an optically defined interface via which the laser is introduced into the material to be consolidated, consolidation conditions are only achieved in the immediate vicinity of at least one laser focus due to the intensity present there, such that one volume element of the material to be consolidated is consolidated per focus for the duration of the laser pulse or the laser pulse sequence, wherein the laser focus is created by means of a focusing optical system which is preferably movable in at least one plane and a carrier unit is positioned in the material to be consolidated relative to at least one laser focus in such a way that the material to be consolidated accumulates on the carrier unit or on consolidated material that has already accumulated on the carrier unit during the consolidation process.

Moreover, the object is achieved with a method for creating three-dimensional structures consisting of a material to be consolidated, in particular a material containing organopolysiloxane, by way of locally selective consolidation of the latter as a result of light-induced organic cross-linking based on laser radiation, wherein the material to be consolidated is or will be arranged in a material container, a laser pulse or a laser pulse sequence is positioned into at least one laser focus in the material to be consolidated via a focusing optical system, consolidation conditions are only achieved in the immediate vicinity of at least one laser focus due to the intensity present there, such that one volume element of the material to be consolidated is consolidated per focus for the duration of the laser pulse sequence, wherein the focusing optical system is movable and is or will preferably be immersed movable in all three directions in space (X, Y, Z) into the material to be consolidated in the material container, such that an exit surface of the focusing optical system forms an optically defined interface via which the laser pulse or the laser pulse sequence is introduced into the material to be consolidated.

DETAILED DESCRIPTION OF THE INVENTION

In contrast to the prior art concerning known devices and methods, the limiting effects of the working distance of the focusing optical system are resolved with its positionability and the one of the carrier platform, if applicable inside the bath relative to the focus/the foci of the lens/lenses in Z-direction. In fact, the following dilemma arises when using a scanner to position the focus/the foci in the XY plane: if the focus is moved in XY-direction via movable mirrors (scanner system) to position the focus accordingly, the focusing optical system must have a large input aperture (size of the circular input opening, several cm) to produce large solids, to make sure that the laser beam emitted by the movable mirrors is not leaving the focusing optical system. However, only object lenses with a low numerical aperture (NA) (<0.25) or simple lenses as well as so-called F-Θ object lenses have such large input apertures. Because of the low numerical aperture, they strikingly reduce both the structural resolution in axial (Z)-direction as well as the lateral resolution (depending on the actual conditions, to voxels with a length (in Z-direction) of 0.5 to 1 mm). As a result, the actual advantage of the two- and multiphoton polymerization, namely the production of tiny, minimal structure sizes, is compensated and no high-resolution structures can be produced such as they are required for bio-medical applications (e.g. porous scaffolds) or optical components. Conversely, when working with object lenses with a high numerical aperture, the addressable range in the plane is severely restricted due to the analogously small input apertures. It can be shown that the addressable range is restricted to a diameter of about 500 µm with a numerical aperture of, for example, 0.95, even when not taking into account the aberrations occurring because of the use of a bath and the associated deviations of the light beam as a result of optically "contaminated" surfaces along the ideal pathway. In contrast, if a carrier would be arranged in the bath, said carrier being extensively movable in X-Y plane, it would indeed be possible to achieve the desired results, but only by means of a fairly cumbersome method: As long as the carrier is stationary and the focus is moved in Z-direction either by moving the carrier or the lens and the laser beam by means of a mirror, it is indeed possible to create a high-resolution structure, but its dimensions in the X-Y plane are very small. They can be enlarged by moving the carrier in X- and/or Y-direction each sequentially by a distance in the size of the scannable range. This so-called "stitching" requires a separate positioning unit of the carrier for the X-Y plane which is experimentally problematic, costly and difficult to implement. Moreover, additional software-related expenses are incurred, because the structural geometry has to be calculated separately in several sections. And finally, the seams between the individual areas remain visible in connection with the desired high resolution. The same is true for the arrangement in which the bath can be moved as a whole on a movable table in the X-Y plane.

If large structures are to be created, it is therefore generally necessary with the multiphoton structuring disclosed in the prior art, to intentionally forego a good resolution capacity, firstly because a large working distance (i.e., the distance between the exit pupil of the object lens and the focus) is the prerequisite for the structure to become sufficiently large (the structure cannot become larger than the working distance). However, with conventional object lenses, the working distance is all the larger the smaller the numerical aperture is.

In contrast hereto, an objective lens with a high NA can be used for the bath design according to the invention, even if a large mold is to be produced. According to the invention, these molds can be produced irrespective of the working distance. Therefore, it is possible to select whether fine, high-resolution structures or—by increasing the laser output—also wide lines and hence an elevated construction rate should be achieved (the lines become wider when the laser output is increased because the consolidation conditions are met in a broader three-dimensional space [threshold process]).

The majority of object lenses only achieve the best imaging properties in a specific focal range. If they are derived from microscopy, it is usually found on the underside of the cover glass (corresponding to the inner surface of the wall of the bath tank). Any deviation from this point results in imaging errors and hence smudging of the focus in the space. According to the invention, it is therefore preferred to select the distance of the object lens and the bath and hence the position of the focusing plane in such a way that it has to pass as little of the bath material to be consolidated as possible. With respect to the embodiment of the exposure from below (or from the side if applicable) according to the invention, the resulting advantages in particular include that the conditions for the formation of the focal range do not change during the structuring process, because it is the carrier that is moved in Z-direction rather than the lens and that it is possible to work close to the optimal conditions defined by the lens manufacturer.

According to the invention, any type of object lens can be used, i.e., ones with and without immersion.

Structures with a size up to and exceeding the cm range can be produced. According to the invention, the focusing optical system is immersed into the material and can be positioned there analogously without any restrictions or alternatively, a carrier unit on which the material is deposited while being consolidated, can be positioned arbitrarily in the material bath. The invention also allows for a combination of these two alternatives. It enables the highly flexible creation of three-dimensional structures with sizes up to the centimeter range. In the first case, the focus position can be selected in the material to be consolidated without any limitation, by immersing and positioning the focusing optical system. In the second case, the focus position relative to the material container and hence the material to be consolidated and the location of the material consolidation in the material bath are in fact generally limited, usually to two dimensions, but already consolidated material can be positioned relative to the focus position via the carrier unit, such that the corresponding positioning of already consolidated material allows the creation of structures with almost any size.

Because the laser beam is always introduced into the material to be consolidated via a defined interface, i.e., a transparent optical surface, optical errors are kept at a minimum. The consolidation can be achieved with extremely high accuracy, in fact irrespective of the quantity of material to be consolidated as well as the size of the material bath. The achievable resolution, which is mainly determined by the focal length, focusing optical system and a threshold process in the material, is very high and is not reduced by optical errors in connection with the introduction of the radiation into the material. The material container is preferably a tub with a corresponding size in which the material to be consolidated is provided in the form of a bath. Essentially any size of material baths can be used to support the effect of the creation of structures which are not restricted in terms of their size achieved with the invention.

The present invention is suitable in particular for the manufacture of specific and arbitrarily shaped function elements, for example planar or cylindrical substrates. They include e.g. optical elements for uses in the field of (bio) photonics and for anti-reflective coatings. As well, the simultaneous manufacture of photonic crystals for future photonic circuits and components is possible. Moreover, the structures created with the device can be used in micromechanics (as MEMS or MOEMS) and in micro- and nano-electronics as well as in quantum components and polymer electronics. In addition, the structuring device can be used for life science applications, e.g. in orthopedics (for prosthetics among other things), regenerative medicine (e.g. as carrier structures) and for pharmaceutical applications (including as drug delivery systems).

A material to be consolidated within the meaning of the invention is an organic material or an inorganic/organic hybrid material, in particular a material containing organopolysiloxane, each of which can be consolidated photochemically. In particular, the material to be consolidated can be a material filled with nano- or microparticles, for example, or an unfilled material. Filled materials comprise certain additive materials which are unbound under certain circumstances, said additive materials potentially conveying certain desirable properties to the material.

The bath material to be consolidated can either be processed solvent-free or containing solvent. The type of used solvent is not critical for the latter case; however, non-toxic solvents are favorable, for example if the structures to be produced are intended for medical or related applications. If no solvent is used, the bath material can be highly viscous, depending on the used polysiloxane, which is usually formed by polycondensation of one or a plurality of organically polymerizable silanes. In these cases, the use of a lens positioned outside the bath is preferable.

Working with a solvent-free bath material has a number of advantages. For example, the structures produced with it do not contain any small-molecular, potentially toxic or otherwise harmful compounds.

If it is intended to separate the consolidated mold from the substrate, the latter can be designed in a previously known fashion as necessary (by means of monomolecular or thicker layers) in such a way that the separation is possible during the development process by way of solvent removal or by way of "lifting up" the structure by means of a specially arranged device (e.g. a knife). Alternatively, a sacrificial layer can be applied to the substrate, which the consolidated mold adheres to, but which dissolves during the development process (the removal of adhering bath material) in such a way that the created structure is lifted up from the substrate.

The produced solid can simply be removed by lifting it out of the bath, for example by moving the carrier out of the bath. It is then rinsed with a suitable solvent as necessary to remove any adhering bath material and air-dried or dried otherwise (e.g. in an inert gas atmosphere).

The invention allows the in situ manufacture of three-dimensional solids of any shape consisting of materials to be consolidated by way of light-induced cross-linking processes across a wide wavelength range with the use of different laser and optical systems. It is basically possible to work on a multitude of material and substance classes simultaneously and extensively.

Two- or multiphoton polymerization (2PP/nPP) is used for the targeted consolidation. In the process, a focused laser pulse or a succession of focused laser pulses is specifically aimed at an addressed volume element in the material to be consolidated. A laser pulse sequence or a sequence of laser pulses refers to a number of chronologically successive single laser pulses used to consolidate a structural unit (voxels). The number of pulses is at least two, preferably 100 to 1000 or several hundred to several thousand. The laser pulse or the laser pulse sequence achieves two- (TPA) or multiphoton absorption at the location of the volume elements to be consolidated in the focus, wherein similar chemical alterations can be induced as with the use of considerably shorter wavelengths. In this fashion, a material change can be triggered very specifically in the three-dimensional space. It is particularly advantageous to use laser pulses with a duration in the femtosecond range. Advantageously, the used radiation has a wavelength that is not absorbed in the reactive material under normal circumstances in which the energy of a photon is not sufficient to stimulate atoms or molecules. In contrast to other structuring procedures, such as the classical rapid prototyping with stripping and layering over, the present invention has the advantage that three-dimensional structures can be produced in a single step with few materials required and in a very short period of time, wherein structures with almost any size can be produced with high precision.

Depending on the used lens and material, structural units (voxels) smaller than 100 nm to 100 µm can be produced. By adjusting the laser intensity, it is theoretically possible to create infinitesimally small volume elements. With the combination of refractive and diffractive lenses, the optical pathway of the laser pulses through the lens or the lens glass can be kept short and imaging errors can be reduced. The produced voxels can be more or less overlapping and as a whole form the one- to three-dimensional structure to be produced. Depending on the size of the produced voxels, it is possible to provide the structure with an arbitrarily scalable porosity. This is of particular significance for the creation of scaffolding structures to stimulate cell growth "scaffolds". Said scaffolding structures can advantageously have a pore structure in the range of 10 nm to 10 mm, preferably from 1 µm to 5 mm. In addition, the produced structures can be nonporous, e.g. in the form of nanostructures.

In the beginning, the positioning is such that the focus or foci are or become positioned near the carrier unit or adjacent thereto. Initially consolidated material accumulates on the carrier unit within the scope of its consolidation and is positioned relative to the focus or foci together with the carrier unit during the further course of the structuring or consolidation process. The further positioning is such that material accumulates on already consolidated material or on the carrier unit.

When the laser beam is aimed through the material container into the material to be consolidated, the material container itself serves the purpose of forming a defined interface where the laser beam enters the material to be consolidated. Because of the material container arranged opposite said positionable carrier unit, the working distance of the used lens by which the distance of the consolidation range is defined from one wall or the bottom of the material container, has no limiting effect.

If a laser beam is introduced through the wall or the bottom of the material container, it is particularly advantageous if no contact is established between the lens and the material to be consolidated. This allows the rapid movement and positioning of the lens. No turbulences are created in the material and the resistance is lower than when positioning an immersed lens. Furthermore, there is no need for the lens to be impermeable to the material to be consolidated. Since no contact is established between the lens and the material to be consolidated, it is also possible to process aggressive materials which would damage the lens.

In the case of a focusing optical system which is immersible into the material, the focusing optical system itself forms a defined optimal interface for the laser beam entering the material to be consolidated. Differently than with the embodiment mentioned above, the consolidation can occur at any location in the material bath, without the need of using an additional positionable carrier unit, because the lens can be positioned in the material bath as desired as well as immersed to almost any depths and the place of consolidation is not restricted by the working distance of the lens.

In one exemplary embodiment, a device according to the invention comprises a lens for the three-dimensional splitting of the laser beam and creation of at least two laser foci or intensity maximums arranged at a distance from each other, hereinafter referred to as parallelization. This way, the laser beam energy can simultaneously be aimed three-dimensionally at two or a plurality of voxels, so that consolidation simultaneously occurs in two or a plurality of locations. This allows the creation of relatively large structures and molds within a short period of time.

The simultaneous creation of n voxels therefore allows the acceleration of the production time of the structures to be produced by factor n, depending on the element to be produced. Said factor n corresponds to the number of intensity maximums or laser foci created by the beam splitting, through which multiphoton polymerization is triggered.

With parallelization, the invention not only allows a parallel creation of voxels of a single function element, but also a parallel creation of two or a plurality of function elements. A single structure can simultaneously be created via a plurality of foci or a plurality of structures can simultaneously be created via one or a plurality of foci each. In the process, one or a plurality of lenses can be used to create n foci. It is possible to produce a plurality of structures on the same substrate as well as to select a separate substrate for each structure.

In addition, parallelization can be achieved by way of beam formation or by splitting one laser beam into a plurality of sub-beams, which are each focused and simultaneously consolidate voxels at several locations in the material. For this purpose, it is possible to use, for example, an amplitude mask introduced into the beam path, which creates a diffraction pattern in the far-field of the beam. In addition, a microlens array, an axicon lens, can be used for example to create a ring-shaped focal plane or an electrically controllable three-dimensional light modulator as a dynamically variable phase mask, which achieves a specific distribution of the light intensity of a plurality of foci and hence a partial parallelization of the structuring process. In addition, the foci can be moved in space by means of targeted dynamic modulation of the phase, and no mechanical shifting units are required as a result.

The device according to the invention comprises a positioning system used to position the laser focus or the laser foci in the material bath. The positioning is achieved with a movement of the focusing optical system, supplemented with a movement of a carrier unit arranged in the bath, if applicable. It can be carried out in the form of a linear and/or rotatory positioning in and/or by one, two, three or more axes. In particular, a carrier unit for consolidated material can be movable relative to the laser focus, in particular linearly movable and/or rotatable. Because it is not necessary to move the material container, only relatively small masses need to be accelerated and slowed down, thus facilitating an ultra-accurate positioning. The carrier unit can be movable in all embodiments of the inventions, if necessary also in more than one, e.g. in two or in all three directions of space.

In every case, the positioning is achieved by moving the lens. The latter can be movable in one direction of space, e.g. in Y-direction if the carrier in the material bath is movable at least in X- and Z-direction. However, the focusing optical system is preferably movable in at least two directions of space, e.g. in X- and Y-direction, while the carrier can be moved at least in Z-direction. If the focusing optical system can be moved in all three directions of space, which would make sense especially with an immersed focusing optical system, no carrier is required at all in the material bath, or said carrier can be arranged rigidly in the bath.

As well, the position of at least one focus can be selected arbitrarily relative to the material to be consolidated. Different starting points for the material modification can be addressed herewith. If a plurality of laser foci is used, one focal plane is defined for all foci, whose position or location in the material to be consolidated can be addressed. However, if an active, dynamic room light modulator is used, it is generally possible that the relative position of foci to each other can be varied dynamically. If a defined point in the material in a focal range is to be consolidated, its position can be corrected e.g. by means of software if the substrate surface (carrier surface) is known, while the data of an optical detection system, for example in the form of a 3D scanner can be used if the surface texture is unknown. The following applies in this respect:

Curing of the liquid material directly at the surface of the substrate is important with (multiphoton) structuring of liquid materials. An anchor point is required for this purpose, to ensure that the next volume element (voxel) to be consolidated is in contact with the already consolidated area or the substrate. If this is not the case, already consolidated areas can drift away from their target position in liquid resin, thus impairing the structural quality. This can result in a defective structure. If the anchor point was not located correctly on the substrate, the structure may indeed have been generated correctly, but it can ultimately not be located because it no longer adheres to the substrate during the development and can no longer be found. Therefore, preferred embodiments of the invention relate to the location of said anchor point (or also a plurality of said anchor points as applicable).

In a first respective embodiment, said anchor point is detected by means of a microscope camera installed in the system. Said microscope camera is aimed at the surface to be structured; aside from the developing structures, it can also be used to observe the laser spot. When the latter is smallest in the camera image (during the movement in Z-direction), the substrate is hit optimally.

In a second respective embodiment, the anchor point can be found automatically. For this purpose, the sample or the substrate previously introduced into the bath is measured in situ using a detection system (of any kind). The substrate surface-related data obtained in this fashion is used to either determine the anchor point individually for each structure when a plurality of structures are recorded, or, when recording a single (large) structure, to adjust its geometry in such a way that it almost always has a defined orientation to the substrate surface.

The documentation of a complete topography image using a sensor capable of doing this with a "one shot" measurement is particularly advantageous. Alternatively, it is possible to use a single-point sensor, i.e., a sensor that is only capable of measuring a single point in the X-Y plane to scan the substrate surface for creating the topography image.

In both cases, these procedures firstly make it possible to always find the correct anchor point, even in the most common case of a slightly tilted substrate and of course also in the case that the substrate is hidden. Secondly, restructuring on previously structured surfaces is also possible. For example, this allows the addition of structures to previously structured lenses.

A single-point sensor is explained as an example below. A voltage signal is generated, which is relative to the substrate or the target anchor point, depending on the position of the focal range. Said voltage signal should reach a level, preferably a maximum when the anchor point hits the focus. As illustrated in FIG. 12, this can be achieved e.g. with the method of back reflection in the beam path. Before the structuring laser or the pulses are introduced, they pass e.g. a glass slide which is initially not relevant for the propagation of said pulses. Then, the radiation is focused into the material in the traditional manner. Depending on the Z position, a small part of the pulses is reflected back, because of the refractive index contrast present between the substrate and liquid resist material. Said reflection is at the maximum if the interface between the substrate and the resist is hit optimally. Next, the back reflection is tapped with the glass slide which diverts part thereof onto a photodiode.

In one variant, a topography image can be obtained in this fashion, namely if said maximization of the back reflection is repeated in many points on the substrate, and the Z positions where the maximums occur are saved. The laser utilized for the structuring can be used as radiation source as necessary for the back reflection method. In so doing, its output is advantageously set very low to prevent the risk of bringing about an unwanted consolidation of bath material with the light beam intended for the back reflection. However, it can be more favorable to use a second laser that does not interact with the resist and is focused in the same point as the structuring laser. In another variant, a controller also makes it possible that a certain signal level of the back reflection is always maintained by compensating the Z position, while the focus is moved in the plane. Known controllers such as Pis or PIDs are suitable for this purpose.

Because the focus is moved relative to the substrate in the XY plane according to the invention and hence the focus position in Z changes relative to the substrate and hence the signal of the back reflection changes, it is necessary to control the difference between the target value (the maximum voltage signal) and the (dynamic) actual value. Mathematical calculations are performed for this purpose to transmit a signal to the control element (the Z axis), aimed at approximating the actual value to the target value. The person skilled at the art is able to perform said calculations (usually proportional (P), integral (I) and differential operations (D)) and to select the parameters such that an accurate adjustment of the actual to the target value is achieved.

A PI controller combines the advantage of the P controller, namely fast reaction, with the advantage of the I controller, i.e., the exact deviation control. A Pl-controlled circuit is therefore accurate and moderately fast. A PID controller combines the favorable characteristics of all three controller types. The PID-controlled circuit is accurate and very fast. Therefore, a PID controller is very suitable for the invention.

The positioning accuracy of at least one or each motion axis preferably amounts to at least 0.20 µm. The use of positioning systems in the form of ultra-precise linear tables, for example, tables with air bearings or tables movable with piezo technology, having large travel pathways as well as optionally of large substrates or material baths (e.g. 62 cm×62 cm) allows the creation of both small structures with dimensions of less than one millimeter as well as macroscopic solids with edge lengths of several centimeters.

According to a particularly advantageous embodiment, it is possible to use a positioning device with at least one rotatable axis instead or in addition to the linear positioning in the three-dimensional planes. This makes it possible to rotate either the material to be consolidated or a carrier unit immersed into said positioning device around at least one three-dimensional axis. Substrates in the form of rolled up foils or similar can be used which subsequently serve as carrier unit or are positioned with one of the latter. The foil-like substrates can be guided by means of rotational positioning and positioned relative to at least one laser focus. The rotational positioning is preferably achieved with a resolution of at least 0.079 arcseconds and/or a speed of at least 3 micro-arcseconds. The maximum rotational speed preferably amounts to about 300 rotations per minute with a repeatability of less than 2 arcseconds.

In a particularly advantageous design, the positioning system comprises the following characteristics: the travel range, ideally in every direction, preferably amounts to at least 150 mm, in particular in every direction of space. The positioning accuracy in every direction is preferably ±0.20 µm. The accuracy in connection with the repeated approach of a point is ±0.05 µm. The accuracy perpendicular to the direction of travel in the horizontal plane in particular amounts to ±0.25 µm and the accuracy perpendicular to the direction of travel in the vertical plane to ±0.25 µm. The traverse rate of the positioning system is up to 300 mm/s (although lower speeds are possible as well), with a maximum linear acceleration under no load conditions of about 10 m/s².

Solid-state lasers, diode-pumped solid-state lasers, semiconductor lasers, fiber lasers, etc. with any wavelength can generally be used as a radiation source. In one embodiment of the invention, it is particularly advantageous to use an Ytterbium laser system. When the frequency is doubled, its wavelength is within the range of green light. Compared to Ti-sapphire laser systems, whose wavelength is approximately 800 nm, the advantage of Ytterbium lasers is their wavelength of 1030 nm. When the frequency is doubled, the latter is within the green range at 515 nm, which can result in better resolution. Moreover, the structurable materials can be processed more efficiently than with lasers with wavelength ranges of approximately 800 nm. In terms of material formulations, the process window is considerably larger. When the frequency is doubled, a Ti-sapphire laser disadvantageously is in the UV range at about 400 nm. However, this is such a high-energy spectral range that the exposure of the majority of material systems to be consolidated would already achieve a 1PP process which can be prevented with the use of laser systems having larger wavelengths. Another disadvantage of Ti-sapphire lasers is that the duration of their laser pulses is usually too short. This would indeed achieve greater process efficiency, but it also creates problems, because short pulses have a very broad spectrum and imaging errors are more likely to occur. Short pulses are generally more difficult to manage, potentially being more costly and time-consuming.

Finally, the use of Ytterbium laser systems is generally possible. It is advantageous that these lasers can be pumped with diodes and that no additional pump lasers and various other instruments are required. However, relatively short pulses are the advantage of Ytterbium lasers compared to Nd:YAG lasers. While Ytterbium lasers can achieve pulses of far less than one picosecond, the pulse lengths of an Nd:YAG laser are generally greater than one picosecond and hence rather unfavorable for triggering a non-linear absorption, because of the risk of weakly cross-linked and labile structures which can result in the disadvantages described above.

The pulse lengths required for efficiently triggering a non-linear absorption are smaller than one picosecond. Additional photoinitiators can be used to improve interactions between light and material and for the more efficient stimulation of the polymerization. The repetition rate can preferably be set between 1 kHz and 80 MHz, preferably between 10 kHZ and 80 MHz. In agreement with the given material system, wavelengths in the UV range, in the visible range as well as in the infrared range can be used. In particular, the lasers can have outputs between 100 mW and 5 W, preferably between 150 mW and 2 W and/or a pulse length of less than 1 picosecond and/or a repetition rate between 1 to 80 MHz.

With the device according to the invention, the laser beam can be split or the three-dimensional beam formation achieved in different fashions. It can be brought about with the use of passive DOEs (diffractive optical elements) such as for example phases or amplitude masks, or with microlens arrays or active, preferably dynamically adjustable DOEs as well as combinations of said elements. Consequently, any intensity distributions can be effectuated, such as for example a plurality of foci or foci with arbitrary shapes, which allow the recording of one structure each with a plurality of foci which may be shaped as needed. DOEs for phase modulation are particularly advantageous, because, compared to DOEs with amplitude masks, they are associated with no or only minor output losses. In addition, the use of active (transmissive or reflective) three-dimensional light modulators is possible. A one-dimensional grid with a grid distance of preferably less than 10 µm or a two-dimensional array with a pixel distance of preferably less than 10 µm can advantageously be used as a mask.

Moreover, a plurality of focusing optical systems can be used. They can then be moved relative to the carrier material (substrate) in such a way that a plurality of structures can simultaneously be recorded with one focus each. The use of a plurality of focusing optical systems requires the splitting of the laser output through conventional beam splitters into a plurality of beams which are each aimed at one focusing optical system. Finally, a combination of the beam formations above is possible, in that a modulator first creates the desired intensity distribution of the radiation and the latter is subsequently focused through a plurality of lenses. Similarly, it is also possible to use one modulator or one mask each per focusing optical system. This variant enables the recording of a plurality of structures simultaneously with a plurality of foci each.

Every focusing optical system can be movable relative to other elements of the beam guide, the material container, the material to be consolidated and/or the carrier unit in such a way that only the focusing optical system alone needs to be moved for the positioning and the remaining elements of the beam guide can be installed rigidly. Particularly in the case of positioning by way of a movement of the lens, the laser beam can be guided at least in partial areas of the beam guide via optical waveguides in a particularly advantageous design.

Hybrid lenses consisting of diffractive optical elements and conventional lenses can be used to prevent focusing-related imaging errors. The diffractive optical elements consist, for example, of quartz glass, materials containing organopolysiloxane, fluids or any material combination. Using focusing optical systems without adjusting the index of refraction results in a positioning error in connection with variable penetration depths of the light into the material, said positioning error being due to the refraction at the interface between the air and material (i.e., the movement of the focus does not coincide with the movement of the lens). Said deviation in the Z positioning of the focus can be compensated with a corrective factor, e.g. by means of computer software.

The device and method of the present invention are advantageously not restricted by refraction limits of the focusing optical systems, because a different absorption behavior is present than with linear single-photon absorption on the one hand and because a threshold process is utilized on the other hand. With multi-photon absorption, the absorption profile (approximating a Gaussian profile) continues to be narrower, thus allowing better resolution, because of the nonlinear correlation between the photon density and the absorption behavior. While the absorption behavior of the single-photon absorption is characterized with linearity opposite the photon density and can be explained with classical physics, the simultaneous absorption of two or more photons has its origins in quantum mechanics. It can be shown that the probability for multiphoton transitions increases with very high peak intensities (photon densities). A non-linear behavior opposite the photon density is present, whereby the absorption profile becomes narrower. Based on a threshold process associated with the used materials, a reaction only takes place in a three-dimensional space in which the laser intensity exceeds said threshold value. As a result, the reaction can take place in a very tight three-dimensional space, thus allowing the creation of ultra-accurate structures.

With a further embodiment of the invention, the device can comprise a dispenser system for the in situ deposition of the material to be consolidated. Advantageously, said system allows material to be consolidated to be added to the material bath to match the respective process status. In particular for the production of large solids or structures with sizes up to the millimeter or centimeter range, this has the positive effect that the bath only needs to contain as much material as required to create the first voxels at the beginning of the manufacture. More material to be consolidated is only added via the dispenser system during the course of the further manufacture and as the solid continues to grow, preferably always only at the quantity required for creating the next voxels. In this fashion, the bath is always only filled with the quantity of material to be consolidated required for the current creation of voxels, with the advantage that only a relatively small mass needs to be moved in connection with the positioning movement of the bath and when a lens immersed in the material is positioned by way of a movement, the lens does not need to be moved deeply immersed in material, whereby flow resistances and swirling in the bath are prevented for the most part, which has a positive impact on the quality of the created solids. In particular, the dispenser system can comprise freely actuatable nozzles allowing a locally definable feed of material to be consolidated, wherein the conservation of materials results in a considerable cost reduction and protection of resources during the manufacture of the function elements. The dispenser system preferably possesses a high positioning accuracy in the micrometer range. Basically, the procedure described above can also be performed manually without the use of a dispenser system.

According to another proposal, the device can comprise a scanner system, in particular a 3D scanner, or such a scanner can be used for the method. This allows the digitalization of templates or solids with any shapes and the obtained data can be used to record solids and structures with complex shapes into the material to be consolidated directly in the machine. In particular, structures produced with the device can be used as master structure for further molding techniques. In the process, both the single use as well as the repeated use of the same master is intended.

Other characteristics and advantages of the invention can be derived from the following exemplary description of particularly preferred embodiments based on the figures. In the figures:

FIG. 1 shows a schematic illustration of a device according to the prior art,

FIGS. 2 to 4 show schematic illustrations of first embodiments of devices according to the invention with exposure of the material containing organopolysiloxane through a material container, FIGS. 5 to 7 show schematic illustrations of second embodiments of devices according to the invention with exposure of the material containing organopolysiloxane through a focusing optical system immersed in the material, FIGS. 8 and 9 show schematic illustrations of third embodiments with the use of elements for three-dimensional beam shaping and FIGS. 10 and 11 show schematic illustrations of fourth embodiments having a positioning system with a rotational axis.

Figure 14A:
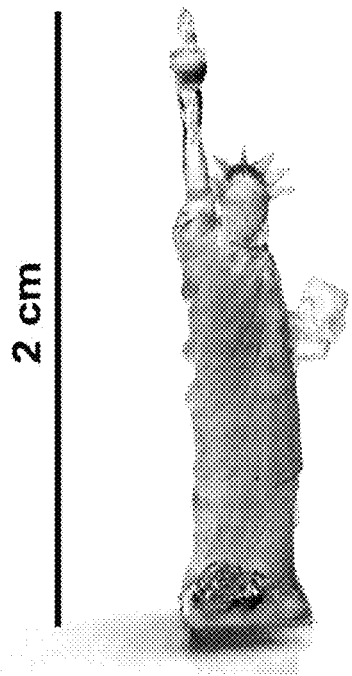
Figure 14B:
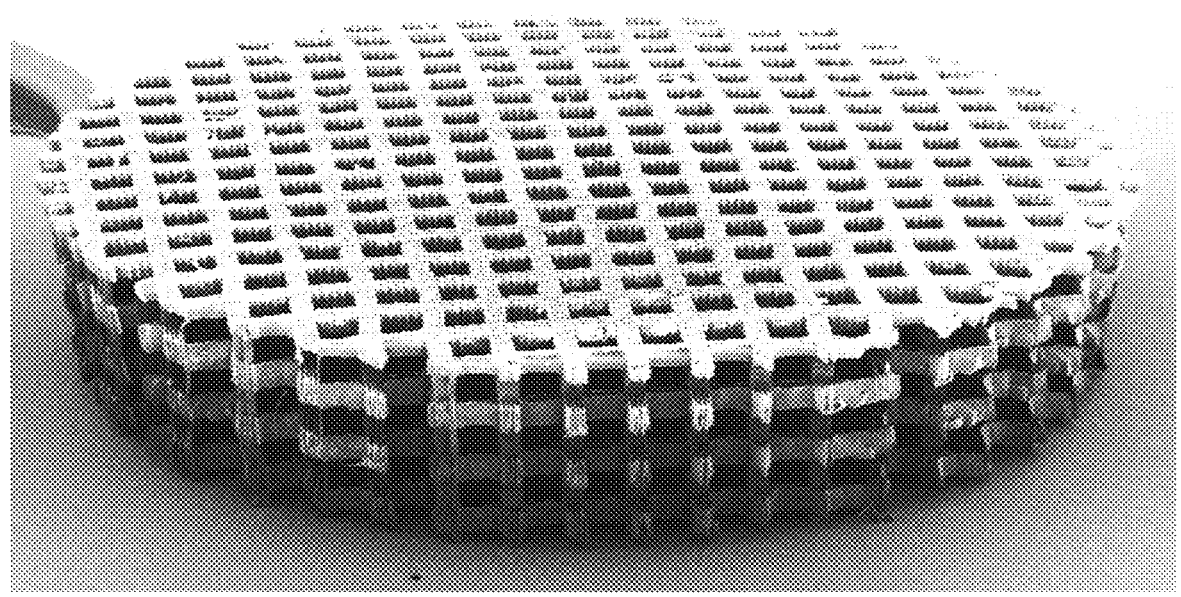

FIG. 14a and b show two three-dimensional structures produced according to the invention with very different sizes, of which the latter can be used as "scaffold" (the distance from one of the large square openings to the other is approximately 300 µm).

Figure 1:
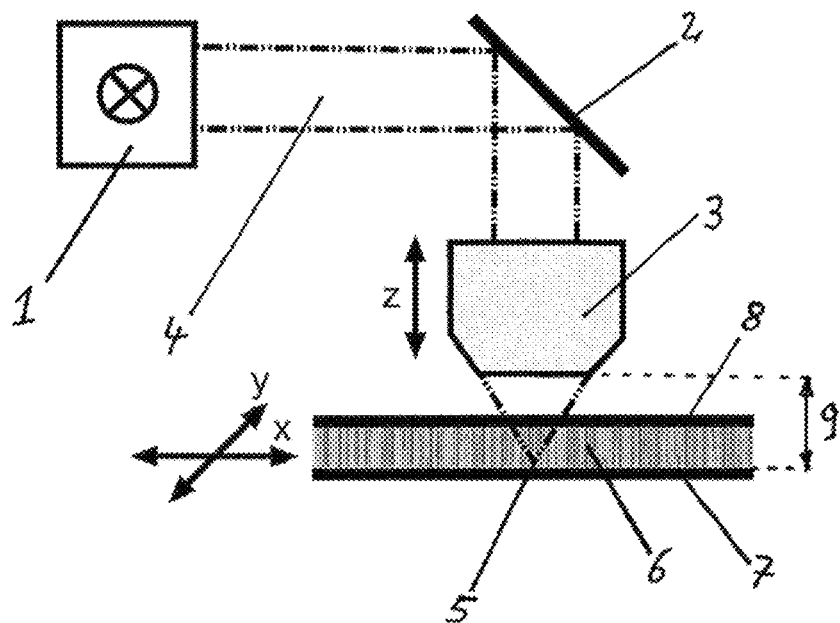

FIG. 1 contains a schematic illustration of a device used to explain part of the invention. The device according to this figure comprises a laser source 1, a deflection mirror 2 as component of a beam guide as well as a focusing optical system 3. The unfocused laser beam 4 exiting the laser source 1 is guided to the focusing optical system 3 through the deflection mirror 2. There, it is focused into a focus 5.

Material to be consolidated 6 is arranged below the focusing optical system 3, between a lower carrier 7 and an upper carrier 8. As implied schematically in FIG. 1, the material retainer consisting of lower carrier 7 and upper carrier 8, together with the material to be consolidated 6 placed in between, can be positioned in X- and Y-direction relative to the focus 5 and the focusing optical system 3, while the focusing optical system 3 can be positioned in Z-direction relative to the material 6.

FIG. 1 shows an arrangement of the focusing optical system 3 relative to the material to be consolidated 6 at the start of a consolidation cycle. The focus 5 borders directly on the lower carrier 7 such that material consolidated in the focus area accumulates on the carrier 7. This initial positioning is required in order to consolidate material within the scope of the further consolidation in a fixed position or else no defined structures can be built up. In order that said initial positioning of the focus can be approached, the distance between the respective top side of the lower carrier 7 and upper carrier 8 has to be smaller than the working distance 9 of the focusing optical system 3. Otherwise, it is impossible to position the focus 5 on the lower carrier 7 and to accumulate consolidated material there. In the event of an initial accumulation at the underside of the upper carrier 8, the distance between the lower carrier 7 and upper carrier 8 could indeed be greater than the working distance 9 of the focusing optical system 3. However, in this case, the consolidation would only be possible with a limited distance to the upper carrier 8, corresponding to the working distance 9 less the thickness of the upper carrier 8. As a result, the geometry and size of producible structures are restricted in an undesirable manner.

Figure 2:
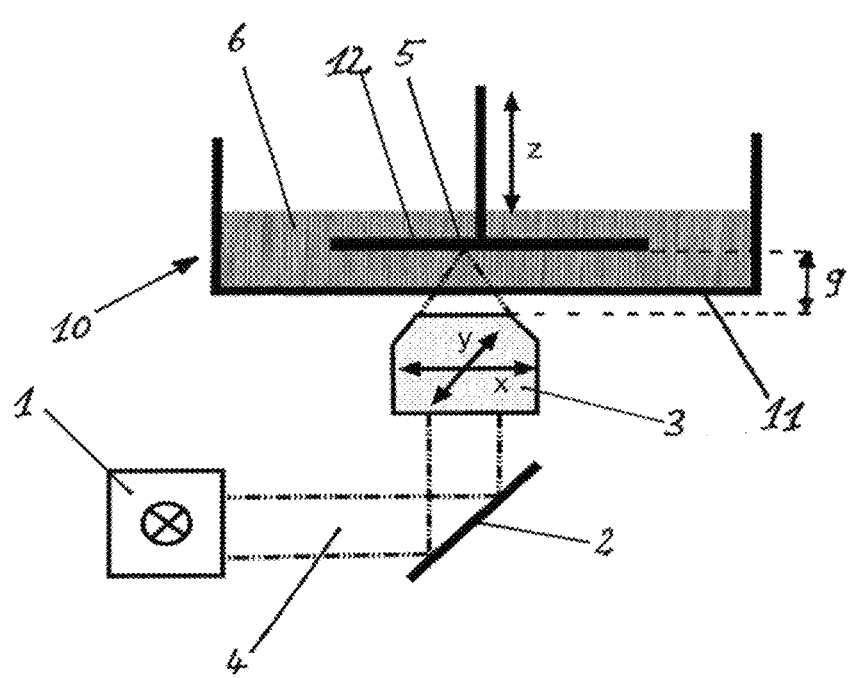

FIG. 2 shows a first embodiment of the invention in which the exposure of the material to be consolidated is achieved through a material container 10. In the illustrated case, the exposure is conducted through the bottom 11 of the material container 10 from below, by directing an unfocused laser beam 4 created in the laser source 1 via a deflection mirror 2 to a focusing optical system 3 arranged underneath the material container 10. The deflection mirror 2 can be designed positionable. The beam is focused by the focusing optical system in the material to be consolidated 6 in the material container 10. Similar to the device according to FIG. 1, the maximum depth at which the focus can be immersed into the material to be consolidated 6 is limited by the working distance 9 of the focusing optical system 3. In order to prevent the resulting size restriction of the producible structures, the device illustrated in FIG. 2 comprises a carrier unit 12 that can be positioned opposite the material container 10. The carrier unit 12 is immersed in the material to be consolidated 6 in the material container 10. In the illustrated example, the carrier unit 12 is positionable in Z-direction, while the focusing optical system is positionable in X- and Y-direction.

FIG. 2 again contains an exemplary illustration of the start of the creation of a structure. In the process, the carrier unit 12 is positioned relative to the material container 10 and focus 5 in such a way that the focus is adjacent to the lower surface area of the carrier unit 12. Material that has consolidated in the vicinity of the focus 5 is deposited at the underside of the carrier unit 12 and adheres to it. Matching the dimensions of already consolidated volume elements, the carrier unit 12 can be positioned in Z-direction in such a way that the focus comes to rest at an interface of already consolidated material and subsequently consolidated material is deposited on already consolidated material and adheres to it. The position of the consolidation in X- or Y-direction is determined with the positioning of the focusing optical system 3 in X- as well as Y-direction and with the corresponding introduction of laser pulses. The carrier unit positionable in Z-direction and the corresponding travel guide makes it possible to consolidate structures whose dimensions are independent and in particular larger than the working distance 9 of the used focusing optical system 3.

Figure 5:
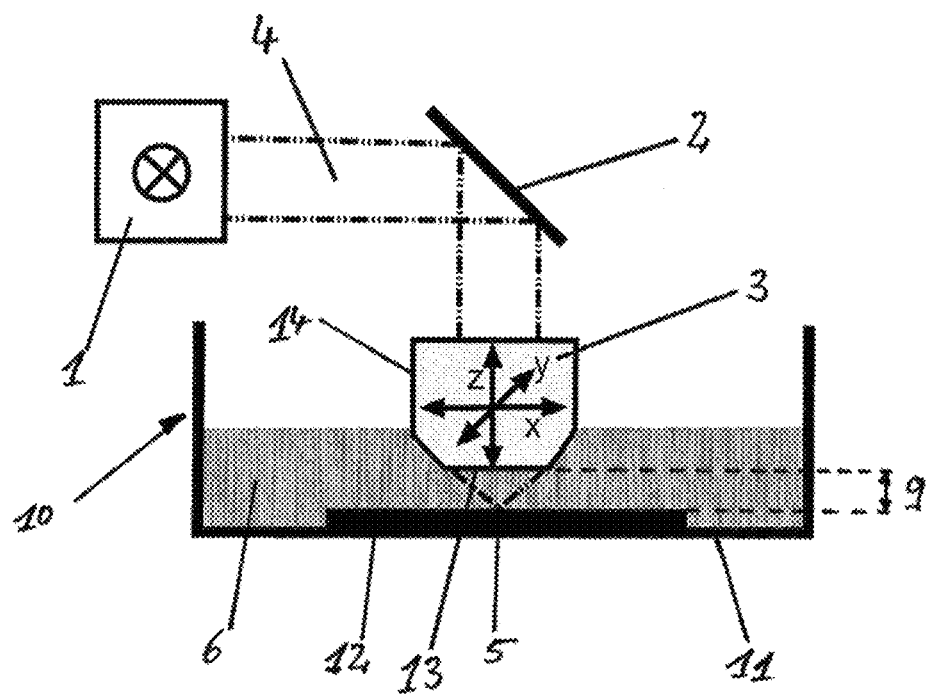

FIG. 5 shows a further schematic illustration of a different embodiment of the invention. The device again comprises a laser source 1, wherein an unfocused laser beam 4 emitted by it is aimed at a focusing optical system 3 via a deflection mirror 2. Moreover, it comprises a material container 10 containing material to be consolidated 6 as well as a carrier unit 12. In the illustrated example, the latter is not mobile, but it can be positionable in one or a plurality of directions. The laser beam is introduced into the material to be consolidated 6 via the focusing optical system 3 immersed in the material to be consolidated 6.

In the illustrated example, the focusing optical system 3 comprises a case 14 with a beam output area 13 and is positionable in the three directions of space X, Y and Z. With the immersion of the focusing optical system 3, the beam output area 13 forms a defined interface with the material to be consolidated 6, thus enabling a defined and accurate introduction of the laser beam into the material to be consolidated 6.

FIG. 5 again shows the device at the start of the structuring process, in which the focusing optical system 3 is arranged relative to the carrier unit 12 at the working distance 9 such that the focus 5 borders on the surface of the carrier unit 12. The consolidation and accumulation in X- and Y-direction is determined with the corresponding positioning in X- as well as Y-direction. After the initial consolidation on the carrier unit 12, the structuring can be performed with the corresponding positioning of the focusing optical system 3 in Z-direction, matching the strength of the already consolidated material adhering to the carrier unit 12. With this embodiment, the height of the producible structures is not restricted either by the working distance 9 of the focusing optical system 3.

Preferably, the present invention is using a focusing optical system 3 with high NA for all possible embodiments, at least with an NA of greater than 0.25 in order to achieve the desired high resolution or small voxels. The working distances 9 of the objective lenses preferably range between 0.1 and 100 mm, more preferably between 1 and 10 mm. We would like to point out that the focus range 5 of the focusing optical system obviously has to be inside the bath 10. Therefore, the thickness of the transparent bath bottom which has to be penetrated also needs to be considered in the selection of the proper working distance. It is favorable if the thickness of the bath bottom is selected in the range of 0.1 and 20 mm, preferably in the range of 0.5 and 5 mm. Values of 0.1 to 2 mm are best for the distance between the focus range 5 and the bath bottom. With lower values, there is a risk that the material consolidates directly on the bottom and adheres there. As a consequence, the removal of the carrier unit 12 would be impaired. Values above the favorable range may result in increasing imaging errors (mainly spherical aberrations). Since the focusing optical system is moved at least in one plane according to the invention (usually the horizontal, i.e., the X-Y plane), the size of the selected NA is not necessarily relevant, especially with a minimum value of 0.25.

A high-NA object lens with NA=1.4 and a working distance of 200 μm is used in one example of the invention, which is designed in such a way that an ideal focus is formed if a 170 μm thick container bottom is used, immersion oil is applied between the exit pupil and the container bottom and the distance of the object lens is selected such that the focus is directly above the inner side of the container bottom, namely such that the created voxel cannot adhere to the container bottom.

Figure 12:
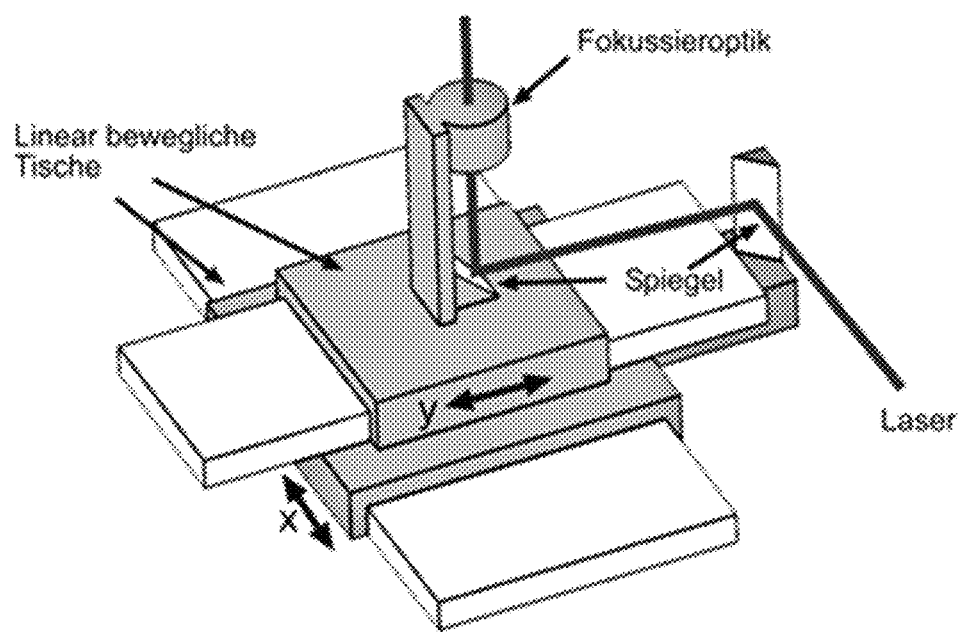
FIG. 12 shows a motion unit for the focusing optical system.
Figure 13:
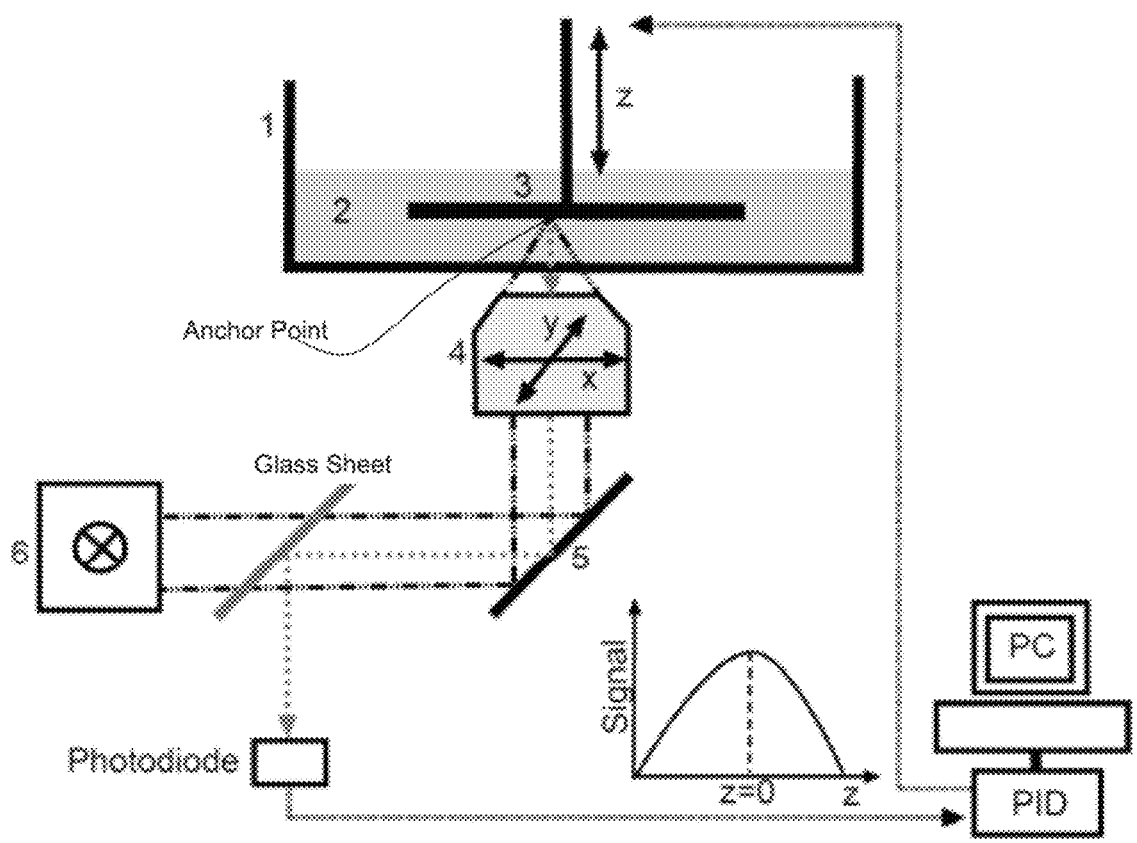
FIG. 13 shows an illustration of the optical detection of an anchor point.

According to the invention, the laser beam is preferably coupled into the focusing optical system by way of a system of mirrors as illustrated in FIG. 12.

Figure 8:
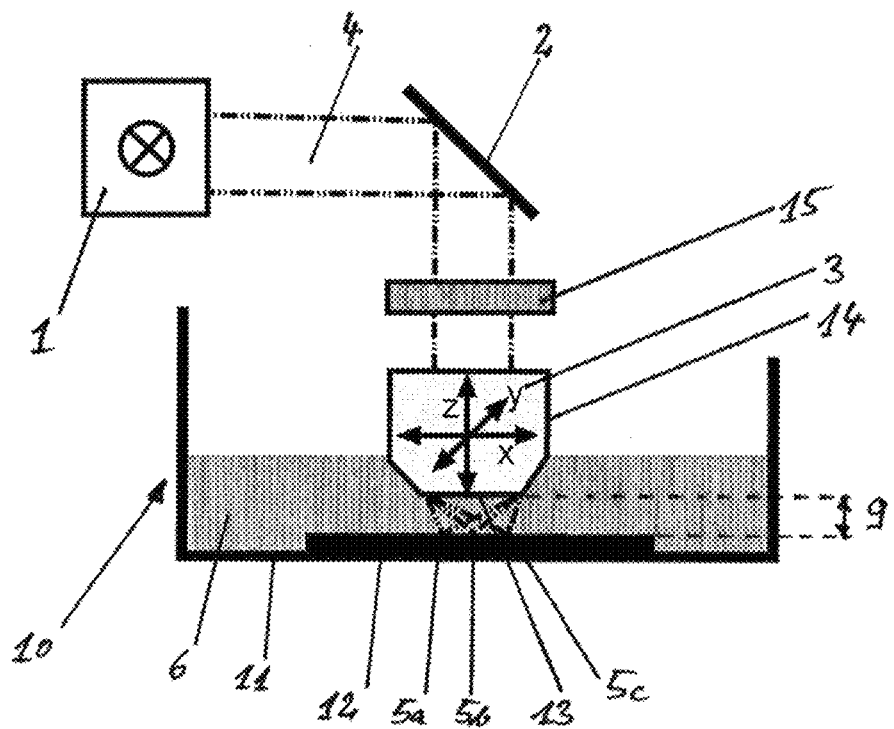
Figure 9:
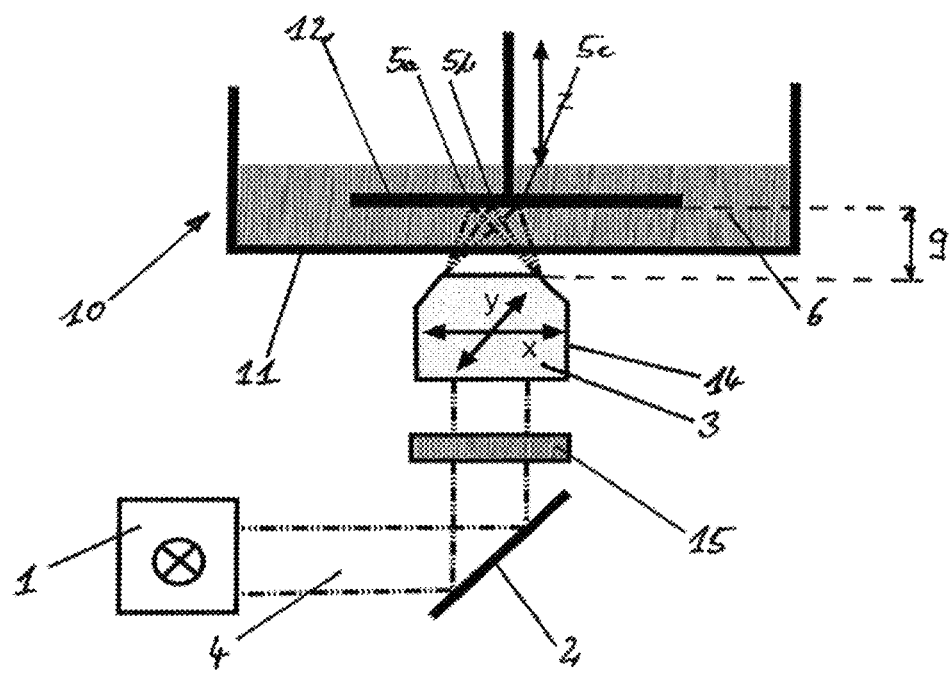

FIG. 8 shows an embodiment of the invention, the design of which essentially corresponds to the embodiment according to FIG. 5. As an additional element, a beam shaping element 15, for example in the form of a phase or amplitude mask, is arranged in the beam path between the deflection mirror 2 and the focusing optical system 3. With the use of the beam shaping element 15, the laser beam is focused into a plurality of foci 5a, 5b and 5c via focusing optical system 3 in such a way that material to be consolidated 6 can be consolidated at several positions simultaneously. In the process, the number of consolidation positions corresponds to the number n of created foci (parallelization). FIG. 9 shows a corresponding use of a beam shaping element 15 within the scope of a device according to the exemplary embodiment of FIG. 2. Reference is made to the description of FIG. 2 above.

Other devices with parallelization are illustrated in FIGS. 3, 4, 6 and 7. In them, the parallelization is achieved with the use of a semi-permeable deflection mirror 16, used to split the unfocused laser beam 4 exiting the laser source 1 into two sub-beams 17a, 17b, each of which are aimed at an independent focusing optical system 3.

Figure 3:
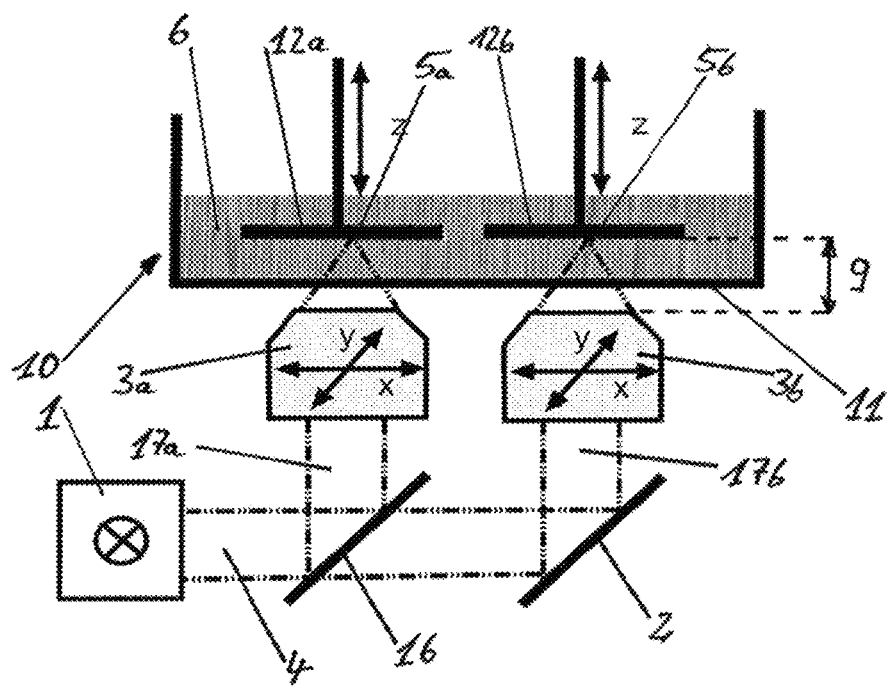
Figure 4:
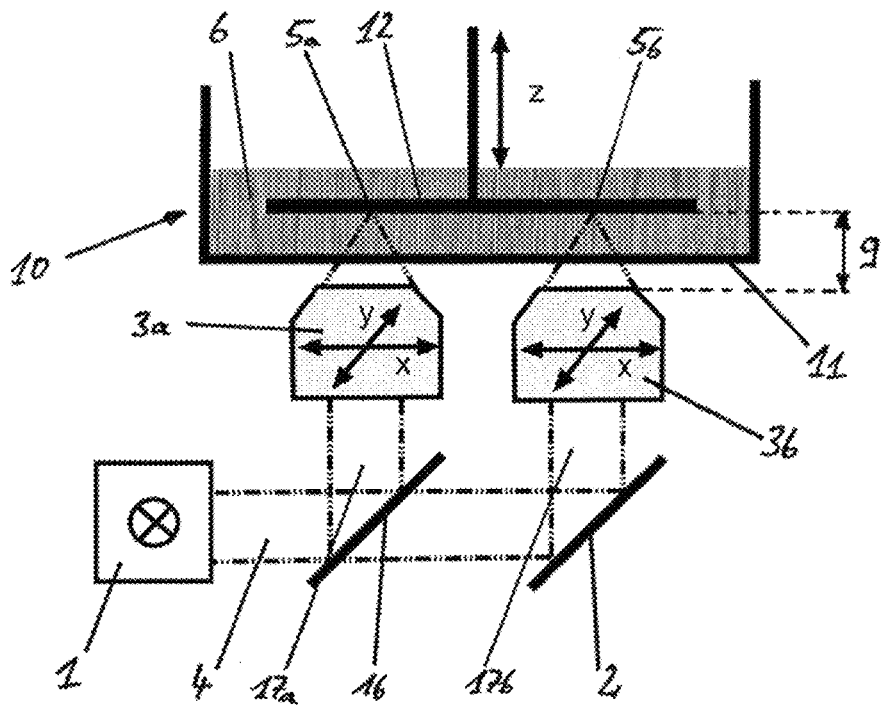
Figure 6:
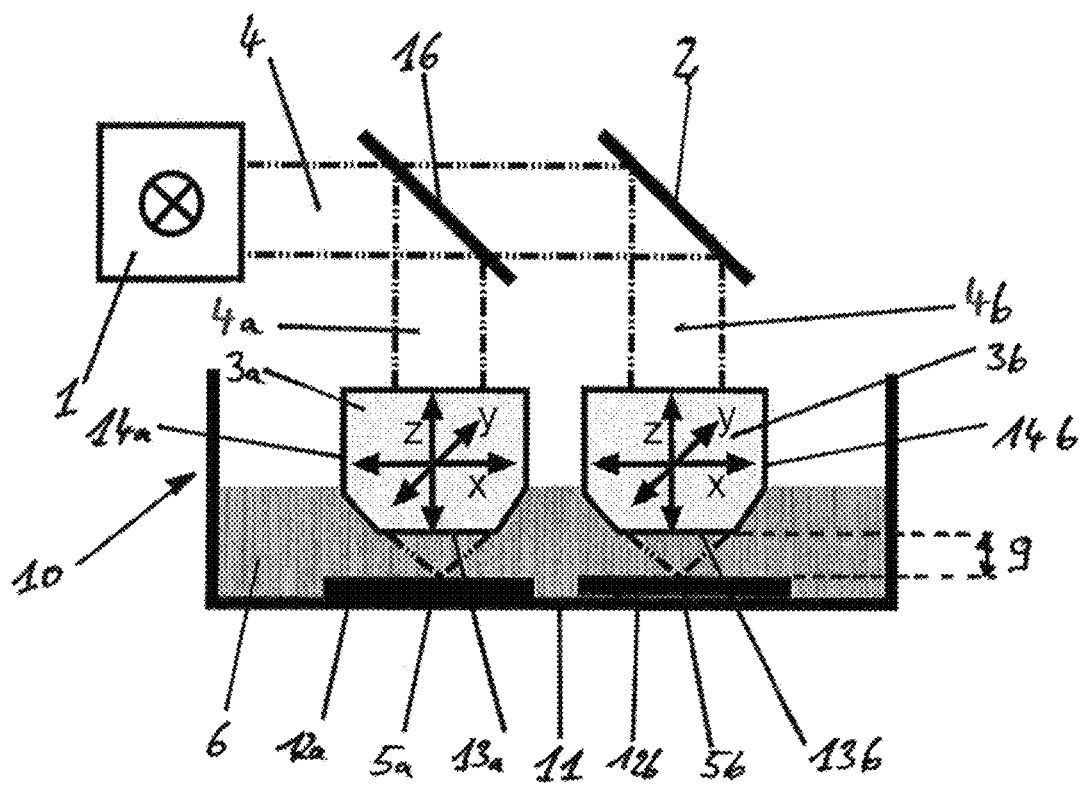
Figure 7:
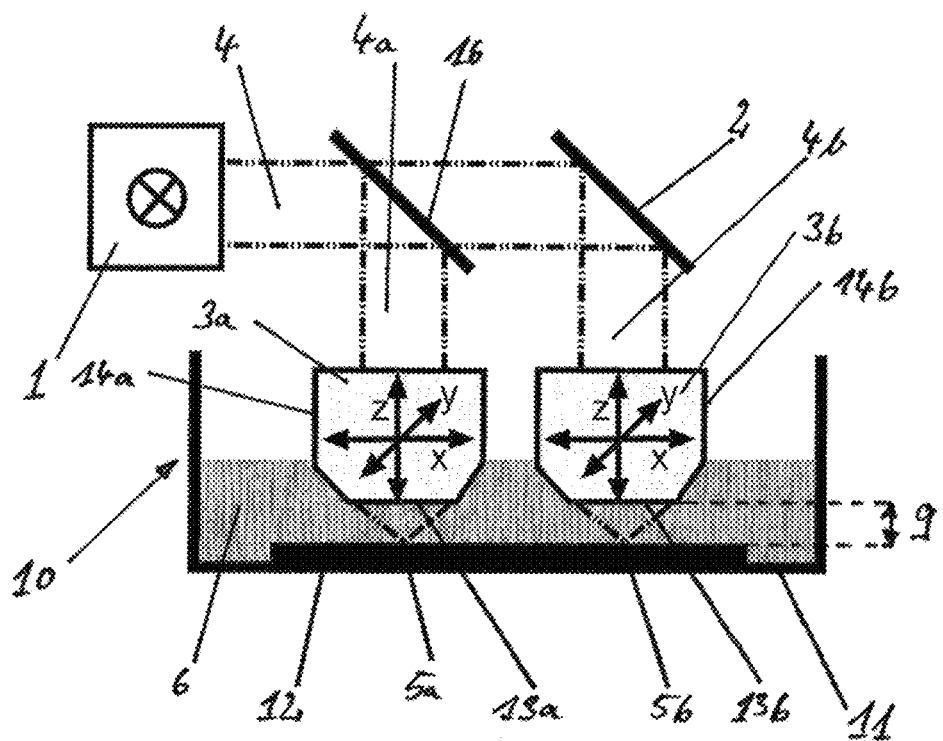

The devices according to FIGS. 3 and 6 comprise two carrier units 12a and 12b immersed into the material to be consolidated 6, which can be positioned in Z-direction jointly or independently from each other. Structures with different geometries can be created simultaneously with said devices, with the corresponding approach of the positioning axes. FIGS. 4 and 7 show devices in which it is possible to record at several positions on a carrier unit 12 simultaneously by means of parallelization, said carrier unit being immersed in the material to be consolidated.

Figure 10:
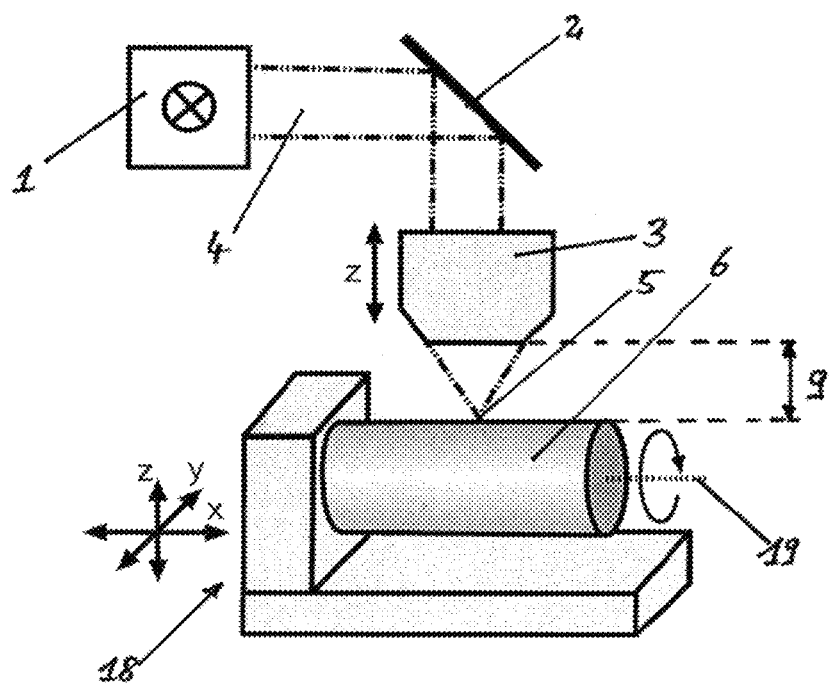
Figure 11:
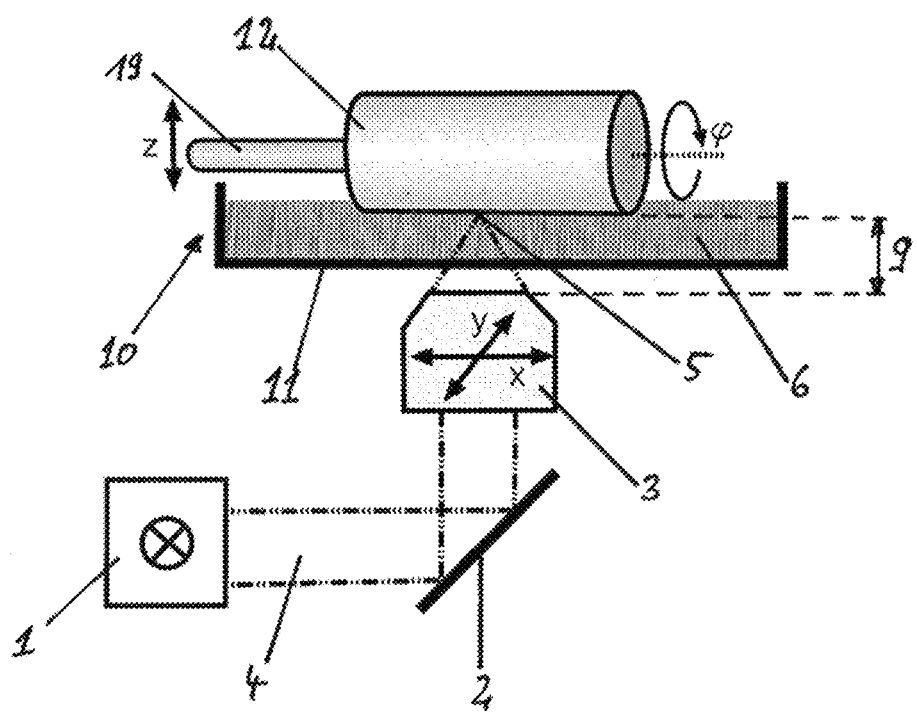

Another embodiment of the invention is illustrated in FIGS. 10 and 11. In it, a rotary table 18 that allows a rotational positioning e.g. around a rotational axis 19 additionally or alternatively to a linear positioning is used instead of only a single linearly positionable carrier unit 12. The rotary table 18 illustrated in FIG. 10 serves the positioning of a foil-shaped carrier unit with material to be consolidated 6 relative to the focus 5.

In the device illustrated in FIG. 11, a carrier unit 12 which can be rotated around a rotational axis 19 and can be positioned linearly in Z-direction is immersed in a bath of material to be consolidated. The focusing optical system 3 can be positioned linearly in X- and Y-direction. The focus position is set such that material 6 is consolidated, deposited and virtually rolled up on the carrier unit 12.

REFERENCE LIST

1 Laser source
2 Deflection mirror
3 Focusing optical system
4 Unfocused laser beam
5 Focus
6 Material to be consolidated
7 Lower carrier
8 Upper carrier
9 Working distance
10 Material container
11 Bottom
12 Carrier unit
13 Beam output
14 Case
15 Beam formation element
16 Semi-permeable deflection mirror
17a,b Sub-beams
18 Rotary table
19 Rotational axis

What is claimed is:

1. A device for creating three-dimensional structures consisting of a material to be consolidated, by way of locally selective consolidation of the material as a result of light-induced organic cross-linkage, comprising
a laser source,
a movable focusing lens to form one or a plurality of laser foci and
a material container for the material to be consolidated,
wherein the laser source and the focusing lens are formed to create laser pulses or laser pulse sequences which trigger a two- or multiphoton polymerization of the material to be consolidated in their focal point, and
wherein the focusing lens comprises a numerical aperture of greater than 0.25 and is set up such that the distance between the locus range and the bath bottom is at least 0.1 mm,
wherein the material container consists at least partially of a material that is permeable for the used laser beam and is or can be arranged in the beam path in such a way that the laser beam can be introduced into the material to be consolidated through the material container, wherein the material container acts as optically defined interface and
wherein a carrier unit is arranged in the material container which can be positioned opposite to the latter,
said device further comprising a laser spot of the laser for locating an anchor point of a next volume element to be consolidated wherein a back reflection of the laser spot is observed, said anchor point chosen so as to ensure that the next volume element is in contact with the ahead consolidated area of said substrate surface,
wherein the laser spot for locating the anchor point is generated by the laser utilized for the structuring, and wherein the output of the laser is set so as to prevent an unwanted consolidation of bath material with a laser beam intended for the back reflection.

2. A device for creating three-dimensional structures consisting of a material to be consolidated, by way of locally selective consolidation of the material as a result of light-induced organic cross-linkage, said material to be consolidated provided on a substrate surface, comprising:
- an optical detection system for detecting said substrate surface,
- a laser source, and
- a movable focusing lens to form one or a plurality of laser foci, wherein:
- the laser source and the focusing lens are formed for creating laser pulses or laser pulse sequences,
- the wavelength of the laser is chosen such that radiation of the laser source is not absorbed in the material to be consolidated under conditions of linear single-photon absorption,
- said laser pulses or laser pulse sequences are configured to trigger a two- or multiphoton polymerization of the material to be consolidated in their focal point by non-linear absorption,
- the focusing lens comprising a numerical aperture of greater than 0.25, and
- the focusing lens is impermeable to the material to be consolidated and immersed in the material to be consolidated such that a beam exit area of the focusing lens itself forms an optically defined interface with the material to be consolidated,
- said device further comprising a laser spot of the laser for locating an anchor point of a next volume element to be consolidated wherein a back reflection of the laser spot is observed, said anchor point chosen so as to ensure that the next volume element is in contact with the already consolidated area of said substrate surface,
- wherein the laser spot for locating the anchor point is generated by the laser utilized for the structuring, and wherein the output of the laser is set so as to prevent an unwanted consolidation of bath material with a laser beam intended for the back reflection.

3. A device according to claim 1, characterized in that the focusing lens is movable at least in the horizontal (X-Y) plane.

4. A device according to claim 1, characterized in that the focusing lens (3) has a numerical aperture of greater than 0.5.

5. A device according to claim 1, characterized in that the working distance between the object lens of the focusing lens (3) and the associated laser focus is between 0.1 and 100 mm.

6. A device according to claim 1, characterized in that the device further comprises a lens for the three-dimensional splitting of the laser beam and for the creation of at least two laser foci or intensity maximums arranged at a three-dimensional distance from each other.

7. A device according to claim 1, additionally comprising an optical detection system.

8. A device according to claim 7, characterized in that the detection system comprises a light source as well as an electronic registration system.

9. A device according to claim 8, characterized in that the detection system at least partially detects the topography of the carrier unit and is connected with a control system used to register surface points potentially deviating from the target value in such a way that they are activated in an optically correct manner.

10. A device according to claim 1, additionally comprising a dispenser system for the in situ deposition of the material to be consolidated.

* * * * *